United States Patent
Wang et al.

(10) Patent No.: US 9,554,257 B2
(45) Date of Patent: Jan. 24, 2017

(54) AUTOMATIC CALL SYNCHRONIZATION SYSTEM AND METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiaheng Wang, Beijing (CN); Feng Bai, Beijing (CN); Jiuxia Yang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/392,216

(22) PCT Filed: Jul. 3, 2015

(86) PCT No.: PCT/CN2015/083242
§ 371 (c)(1),
(2) Date: Dec. 24, 2015

(87) PCT Pub. No.: WO2016/095498
PCT Pub. Date: Jun. 23, 2016

(65) Prior Publication Data
US 2016/0353260 A1 Dec. 1, 2016

(30) Foreign Application Priority Data
Dec. 19, 2014 (CN) .......................... 2014 1 0798416

(51) Int. Cl.
*H04W 4/16* (2009.01)
(52) U.S. Cl.
CPC ..................................... *H04W 4/16* (2013.01)

(58) Field of Classification Search
CPC ........................................................ H04W 4/16
See application file for complete search history.

(56) References Cited

U.S. PATENT DOCUMENTS 8,737,589 B2 5/2014 Li
2006/0223511 A1 10/2006 Hagale et al.

FOREIGN PATENT DOCUMENTS

CN 1645886 A 7/2005
CN 1713667 A 12/2005
(Continued)

OTHER PUBLICATIONS

Notice of Transmittal of the International Search Report for PCT/CN2015/083242, mailed on Sep. 24, 2015 in Chinese.
(Continued)

*Primary Examiner* — Brandon Miller
(74) *Attorney, Agent, or Firm* — Collard & Roe, P.C.

(57) ABSTRACT

An automatic call synchronization system and method, in which a mobile terminal (101) transmits, when receiving an incoming calling signal and determining that an automatic call synchronization function is turn on, to a wireless signal transponder (104) a call synchronization request carrying the identification information of the mobile terminal (101) and the call information; the pattern recognizer (103), which is connected with the wireless signal transponder (104), authenticates the mobile terminal (101) according to the identification information of the mobile terminal (101), and transmits to a fixed terminal (102) a call access request carrying the identification information of the mobile terminal (101) and the call information through the wireless signal transponder (104) after the authentication is successful; the fixed terminal (102) calls the user of the mobile terminal (101) according to the identification information and the call information, and transmits, when the call is answered by the user using the fixed terminal (102), to the (Continued)

wireless signal transponder (104) a call access response and implements the conversation through a fixed phone operation network matched with the fixed terminal (102). In this way, the call charge may be saved, and automatically performing the call synchronization has flexibility and convenience, thus bringing convenience to the user.

20 Claims, 6 Drawing Sheets

(56) References Cited

FOREIGN PATENT DOCUMENTS

| | | |
|---|---|---|
| CN | 101064755 A | 10/2007 |
| CN | 102014349 A | 4/2011 |
| CN | 103051815 A | 4/2013 |
| CN | 103079182 A | 5/2013 |
| CN | 103873709 A | 6/2014 |
| CN | 104410958 A | 3/2015 |
| CN | 104507063 A | 4/2015 |
| JP | 2007-266927 A | 10/2007 |

OTHER PUBLICATIONS

International Search Report of the International Searching Authority of the International Search Report for PCT/CN2015/083242, mailed on Sep. 24, 2015 in Chinese with English translation.
Written Opinion of the International Searching Authority for PCT/CN2015/083242, mailed on Sep. 24, 2015 in Chinese with English translation.
Chinese Office Action in Chinese Application No. 201410798416.2, mailed Jul. 28, 2016 with English translation.

AUTOMATIC CALL SYNCHRONIZATION SYSTEM AND METHOD

CROSS REFERENCE TO RELATED APPLICATIONS

This application is the National Stage of PCT/CN2015/083242 filed on Jul. 3, 2015, which claims priority under 35 U.S.C. §119 of Chinese Application No. 201410798416.2 filed on Dec. 19, 2014, the disclosure of which is incorporated by reference.

TECHNICAL FIELD

The present disclosure relates to the field of communication technology, and particularly to an automatic call synchronization system and method.

BACKGROUND

With the development of the communication technology, a variety of communication means such as a fixed terminal, a mobile terminal and the like have been popularized in people's live and work. However, the radiation of electromagnetic wave exists during conversation by the mobile terminal, and thus using the mobile terminal for a long time will cause health problems. The places where the mobile terminal is used for the conversation are typically some fixed places such as home, office or the like, and fixed terminals are generally configured in such fixed places. Presently, the call transfer between a mobile terminal and a fixed terminal can be implemented by user's initiative setting. For example, for the user who enables the call transfer function of the mobile terminal, he/she can, when being at home or office, set the call transfer number as his/her fixed terminal number. When the mobile terminal of the user is called by others, he/she may answer the call by a fixed terminal. However, the degree of automation for the present call transfer function is low, and both the enabling and disabling of the call transfer function require the user's setting and related operations to achieve corresponding functions. When the position and environment where the user is located are changed, the call transfer number should also be changed initiatively, which increases the load of the user and largely limits convenience and initiative for the usage by the user.

Thus, it is a problem urgently required to be solved by those skilled in the art how to improve the degree of automation of the call transfer function and to bring convenience to the usage by the user.

SUMMARY OF THE DISCLOSURE

In view of this, an embodiment of the present disclosure provides an automatic call synchronization system and method for improving the degree of automation of the call synchronization function.

Therefore, an embodiment of the present disclosure provides an automatic call synchronization system, comprising a wireless signal transponder, at least one mobile terminal having a wireless communication module, a fixed terminal having a wireless communication module and a pattern recognizer connected with the wireless signal transponder, wherein the mobile terminal is used for transmitting, when receiving an incoming calling signal and determining that an automatic call synchronization function is turn on, to the wireless signal transponder a call synchronization request carrying the identification information of the mobile terminal and the call information;

the pattern recognizer is used for authenticating, after receiving the call synchronization request forwarded by the wireless signal transponder, the mobile terminal according to the identification information of the mobile terminal, and transmitting to the fixed terminal a call access request carrying the identification information of the mobile terminal and the call information through the wireless signal transponder after the authentication is successful;

the fixed terminal is used for calling the user of the mobile terminal according to the identification information of the mobile terminal and the call information after receiving the call access request, and transmitting, when the call is answered by the user using the fixed terminal, to the wireless signal transponder a call access response and implementing the conversation through a fixed phone operation network matched with the fixed terminal.

In one possible implementation, in the above automatic call synchronization system provided by the embodiment of the present disclosure, the mobile terminal is further used for transmitting to the pattern recognizer a conversation access request carrying the identification information of the mobile terminal through the wireless signal transponder when determining that the user answers the call using the mobile terminal;

the pattern recognizer is further used for authenticating the mobile terminal according to the identification information of the mobile terminal after receiving the call access response and the conversation access request forwarded by the wireless signal transponder, and establishing a communication channel between the mobile terminal and the fixed terminal through the wireless signal transponder after the authentication is successful.

In one possible implementation, in the above automatic call synchronization system provided by the embodiment of the present disclosure, the pattern recognizer is further used for determining whether the mobile terminal is located within the range of a wireless network of the wireless signal transponder, and if yes, transmitting an instruction to turn on the automatic call synchronization function to the mobile terminal and the fixed terminal respectively through the wireless signal transponder.

In one possible implementation, in the above automatic call synchronization system provided by the embodiment of the present disclosure, the pattern recognizer is further used for acquiring, when determining that the mobile terminal is located within the range of the wireless network of the wireless signal transponder, the identification information of the mobile terminal through the wireless signal transponder, and transmitting the instruction to turn on the automatic call synchronization function to the mobile terminal and the fixed terminal respectively through the wireless signal transponder after the authentication on the mobile terminal is successful.

In one possible implementation, in the above automatic call synchronization system provided by the embodiment of the present disclosure, the mobile terminal is further used for turn off the automatic call synchronization function when determining leaving the range of the wireless network of the wireless signal transponder.

In one possible implementation, in the above automatic call synchronization system provided by the embodiment of the present disclosure, the pattern recognizer is further used for determining whether the mobile terminal exists within the range of the wireless network of the wireless signal transponder, and if no, transmitting an instruction to turn off the automatic call synchronization function to the fixed terminal through the wireless signal transponder.

In one possible implementation, in the above automatic call synchronization system provided by the embodiment of the present disclosure, the fixed terminal has a voice playing module and/or a display module;

the fixed terminal is used for calling the user of the mobile terminal through the voice playing module and/or the display module after receiving the call access request.

In one possible implementation, in the above automatic call synchronization system provided by the embodiment of the present disclosure, the fixed terminal has a display module;

the pattern recognizer is further used for receiving through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;

the mobile terminal is further used for transmitting through the wireless signal transponder the stored corresponding information to the fixed terminal for displaying after receiving the addressing information acquisition request forwarded by the wireless signal transponder.

In one possible implementation, in the above automatic call synchronization system provided by the embodiment of the present disclosure, the pattern recognizer and the wireless signal transponder are integrated into the fixed terminal.

In one possible implementation, in the above automatic call synchronization system provided by the embodiment of the present disclosure, the pattern recognizer is integrated into the wireless signal transponder.

An embodiment of the present disclosure further provides an automatic call synchronization method, comprising:

transmitting, by a mobile terminal, to a wireless signal transponder connected with a pattern recognizer a call synchronization request carrying the identification information of the mobile terminal and the call information when receiving an incoming calling signal and determining that an automatic call synchronization function is turn on;

after receiving the call synchronization request forwarded by the wireless signal transponder, authenticating, by the pattern recognizer, the mobile terminal according to the identification information of the mobile terminal, and transmitting to a fixed terminal a call access request carrying the identification information of the mobile terminal and the call information through the wireless signal transponder after the authentication is successful;

after receiving the call access request, calling, by the fixed terminal, the user of the mobile terminal according to the identification information of the mobile terminal and the call information; and when the call is answered by the user using the fixed terminal, transmitting, by the fixed terminal, to the wireless signal transponder a call access response and implementing the conversation through a fixed phone operation network matched with the fixed terminal.

In one possible implementation, the above automatic call synchronization method provided by the embodiment of the present disclosure further comprises:

when determining that the user answers the call using the mobile terminal, transmitting, by the mobile terminal, to the pattern recognizer a conversation access request carrying the identification information of the mobile terminal through the wireless signal transponder;

after receiving the call access response and the conversation access request forwarded by the wireless signal transponder, authenticating, by the pattern recognizer, the mobile terminal according to the identification information of the mobile terminal and establishing a communication channel between the mobile terminal and the fixed terminal through the wireless signal transponder after the authentication is successful.

In one possible implementation, the above automatic call synchronization method provided by the embodiment of the present disclosure further comprises:

determining, by the pattern recognizer, whether the mobile terminal is located within the range of a wireless network of the wireless signal transponder, and if yes, transmitting an instruction to turn on the automatic call synchronization function to the mobile terminal and the fixed terminal respectively through the wireless signal transponder.

In one possible implementation, the above automatic call synchronization method provided by the embodiment of the present disclosure further comprises:

when determining that the mobile terminal is located within the range of the wireless network of the wireless signal transponder, acquiring, by the pattern recognizer, the identification information of the mobile terminal through the wireless signal transponder, and transmitting the instruction to turn on the automatic call synchronization function to the mobile terminal and the fixed terminal respectively through the wireless signal transponder after the authentication on the mobile terminal is successful.

In one possible implementation, the above automatic call synchronization method provided by the embodiment of the present disclosure further comprises:

when determining leaving the range of the wireless network of the wireless signal transponder, turn off, by the mobile terminal, the automatic call synchronization function.

In one possible implementation, the above automatic call synchronization method provided by the embodiment of the present disclosure further comprises:

determining, by the pattern recognizer, whether the mobile terminal exists within the range of the wireless network of the wireless signal transponder, and if no, transmitting an instruction to turn off the automatic call synchronization function to the fixed terminal through the wireless signal transponder.

In one possible implementation, the above automatic call synchronization method provided by the embodiment of the present disclosure further comprises:

receiving, by the pattern recognizer, through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;

after receiving the addressing information acquisition request forwarded by the wireless signal transponder, transmitting, by the mobile terminal, through the wireless signal transponder the stored corresponding information to the fixed terminal for displaying.

Embodiments of the present disclosure provide an automatic call synchronization system and method. The system includes a wireless signal transponder, at least one mobile terminal having a wireless communication module, a fixed terminal having a wireless communication module and a pattern recognizer connected with the wireless signal transponder. The mobile terminal is used for transmitting, when receiving an incoming calling signal and determining that an automatic call synchronization function is turn on, to the wireless signal transponder a call synchronization request carrying the identification information of the mobile terminal and the call information. The pattern recognizer is used for authenticating, after receiving the call synchronization request forwarded by the wireless signal transponder, the mobile terminal according to the identification information of the mobile terminal, and transmitting to the fixed terminal a call access request carrying the identification information of the mobile terminal and the call information through the wireless signal transponder after the authentication is successful. The fixed terminal is used for calling the user of the mobile terminal according to the identification information of the mobile terminal and the call information after receiving the call access request, and transmitting, when the call is answered by the user using the fixed terminal, to the wireless signal transponder a call access response and implementing the conversation through a fixed phone operation network matched with the fixed terminal. The above automatic call synchronization system provided by the embodiment of the present disclosure may synchronize a call signal to the fixed terminal automatically when the call signal is received by the mobile terminal, so as to realize that the user may selectively use the mobile terminal and/or the fixed terminal to answer the call, which brings convenience to the user for answering the call and improves the degree of the automation of the call synchronization function. Furthermore, the conversation is implemented via the fixed phone operation network matched with the fixed terminal when the call is answered, thus further saving the call charge.

DETAILED DESCRIPTION

In the following, the specific implementation of an automatic call synchronization system and method provided by embodiments of the present disclosure will be described in detail in conjunction with attached drawings.

Figure 1:
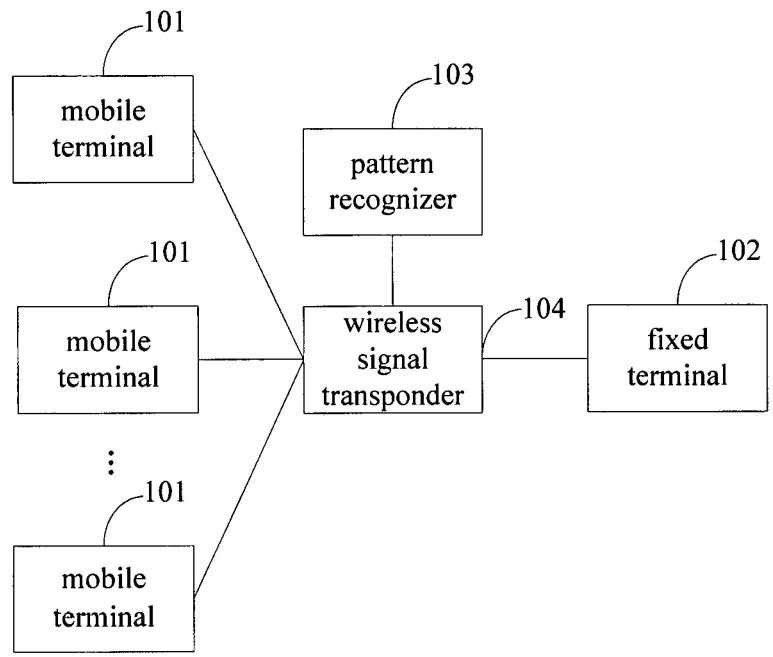
FIG. 1 is a first structural schematic diagram of an automatic call synchronization system provided by an embodiment of the present disclosure.

An embodiment of the present disclosure provides an automatic call synchronization system, as shown in FIG. 1, including: at least one mobile terminal 101 having a wireless communication module, a fixed terminal 102 having a wireless communication module, a pattern recognizer 103 and a wireless signal transponder 104 connected with the pattern recognizer 103.

The mobile terminal 101 is used for transmitting, when receiving an incoming calling signal and determining that its own automatic call synchronization function has been enabled, to the wireless signal transponder 104 a call synchronization request carrying the identification information of the mobile terminal 101 and the call information.

The pattern recognizer 103 is used for authenticating, after receiving the call synchronization request forwarded by the wireless signal transponder 104, the mobile terminal 101 according to the identification information of the mobile terminal 101, and transmitting to the fixed terminal 102 a call access request carrying the identification information of the mobile terminal 101 and the call information through the wireless signal transponder 104 after the authentication is successful.

The fixed terminal 102 is used for calling the user of the mobile terminal 101 according to the identification information of the mobile terminal 101 and the call information after receiving the call access request, and transmitting, when the call is answered by the user using the fixed terminal 102, to the wireless signal transponder 104 a call access response and implementing the conversation through a fixed phone operation network matched with the fixed terminal 102.

It is noted that the fixed phone operation network generally includes respective telephone line networks provided by operators such as China Netcom, China Mobile, China Telecom, etc. A fixed terminal usually realizes the conversation via the network provided a fixed phone operator, while a mobile terminal generally realizes the conversation via the network provided by a mobile terminal operator. It can be seen from above that the operator network used by the fixed terminal to realize the conversation is different from that used by the mobile terminal. Thus, in the above automatic call synchronization system provided by the embodiment of the present disclosure, after the call is answered by the user using the fixed terminal, the fixed terminal and the mobile terminal perform the switching of operators automatically, that, switch the original operator of the mobile terminal to the operator of the fixed terminal.

The above automatic call synchronization system provided by the embodiment of the present disclosure may synchronize a call signal to the fixed terminal automatically when the call signal is received by the mobile terminal, so as to realize that the user may selectively use the mobile terminal and/or the fixed terminal to answer the call, which brings convenience to the user for answering the call and improves the degree of the automation of the call synchronization function. Furthermore, the conversation is implemented via the fixed phone operation network matched with the fixed terminal when the call is answered, thus further saving the fee for the call.

In the specific implementation, the identification information carried in the call synchronization request transmitted from the mobile terminal 101 to the pattern recognizer 103 may specifically be information such as the ID information of the mobile terminal 101, the number information of the user or the like, and the call information may specifically be information such as the name, the number information of the calling user. After the pattern recognizer 103 receives the call synchronization request transmitted by the mobile terminal 101 and forwarded by the wireless signal transponder 104, it may perform a computation according to the corresponding identification information transmitted by the mobile terminal 101 and match with its own database information. If the matching is successful, it means that the authentication on the mobile terminal 101 is successful. After that, the pattern recognizer 103 transmits the call access request to the fixed terminal 102 through the wireless signal transponder 104.

In the specific implementation, in the above automatic call synchronization system provided by the embodiment of the present disclosure, the fixed terminal usually has a voice playing module and/or a display module so that the fixed terminal 102 may, after receiving the call access request, accurately call the user of the corresponding mobile terminal 101. Specifically, the fixed terminal 102 may call the user of the mobile terminal 101 through the voice playing module and/or the display module. For example, Mr. Zhang calls Mr. Li's mobile terminal. After receiving the call access request, the fixed terminal may prompt through the voice playing module that Mr. Li's mobile terminal number, name or other information which is called by Mr. Zhang, or may display that Mr. Zhang's mobile terminal number, name or other information on the display screen of the fixed terminal through the display module. In this way, it is convenient for Mr. Li to confirm that it is his own mobile terminal that receives the call access request. The case in which a call is performed using the calling number and the called person's name as described above is only an example. In the specific implementation, other configuration may also be used to make an incoming call to the user, and it is not limited here.

Further, in the above automatic call synchronization system provided by the embodiment of the present disclosure, in the specific implementation, when one person makes a call to a user by a fixed terminal, the call may be answered by the user using a fixed terminal or may be answered by the user using a mobile terminal. As known by the inventor, after the user selected only one of the fixed terminal and the mobile terminal to be used to answer the call, the unselected terminal can not access to the conversation. However, the above automatic call synchronization system provided by the embodiment of the present disclosure may realize a three-party conversation of the mobile terminal 101, the fixed terminal 102 and the calling person simultaneous, that, after the user answers the call by using the fixed terminal 102, the mobile terminal 101 may be further used for transmitting to the pattern recognizer 103 a conversation access request carrying the identification information of the mobile terminal 101 through the wireless signal transponder 104 when determining that the user answers the call using the mobile terminal 101, and the pattern recognizer 103 may be further used for authenticating the mobile terminal 101 according to the identification information of the mobile terminal 101 after receiving the call access response forwarded by the wireless signal transponder 104 and the conversation access request transmitted by the mobile terminal 101, and establishing a communication channel between the mobile terminal 101 and the fixed terminal 102 through the wireless signal transponder 104 after the authentication is successful. In this way, the three-party synchronous conversation may be realized.

It is worth noting that, in the implementation of the three-party conversation, the communication between the fixed terminal and the calling person is in fact implemented by using the fixed phone operation network matched with the fixed terminal 102, while the conversation between the calling person and the mobile terminal is in fact implemented by using the fixed phone operation network matched with the fixed terminal 102 after being delivered to the fixed terminal 102 via the wireless network between the mobile terminal 101 and the fixed terminal 102. Therefore, there is no direct conversation channel established between the mobile terminal 101 and the user being called in fact, thus the call charge will not be increased.

In the specific implementation, the above automatic call synchronization system provided by the embodiment of the present disclosure further has a function of automatically controlling the mobile terminal 101 and the fixed terminal 102 to turn on the automatic call synchronization function. Specifically, the pattern recognizer 103 is further used for determining whether the mobile terminal 101 is located within the range of a wireless network of the wireless signal transponder 104 is located, and if yes, transmitting an instruction to turn on the automatic call synchronization function to the mobile terminal 101 and the fixed terminal 102 respectively through the wireless signal transponder 104. In this way, the mobile terminal 101 and the fixed terminal 102 are allowed to turn on the automatic call synchronization function if the mobile terminal 101 is within the range of the wireless network of the wireless signal transponder 104 is located, which is convenient for subsequent implementation of the function of the call automatic synchronization.

Further, in the specific implementation of the above automatic call synchronization system provided by the embodiment of the present disclosure, in order to assure the security of the wireless network of the wireless signal transponder, before transmitting the instruction to turn on the automatic call synchronization function to the mobile terminal 101 and the fixed terminal 102 respectively through the wireless signal transponder 104, the pattern recognizer 103 may also authenticate the mobile terminal 101 to exclude mobile terminals unregistered within the wireless network. Specifically, the pattern recognizer 103 is specifically used for acquiring, when determining that the mobile terminal 101 is located within the range of the wireless network of the wireless signal transponder 104 is located, the identification information of the mobile terminal 101 through the wireless signal transponder 104, and transmitting the instruction to turn on the automatic call synchronization function to the mobile terminal 101 and the fixed terminal 102 respectively through the wireless signal transponder 104 after the authentication on the mobile terminal 101 is successful. In this way, the instruction to turn on the automatic call synchronization function is transmitted after authenticating the mobile terminal 101 by the pattern recognizer 103, and thus it may improve the security of the wireless network.

In the specific implementation, there may be many ways for the pattern recognizer 103 to determine whether the mobile terminal 101 is located within the range of a wireless network of the wireless signal transponder 104. For example, an apparatus similar to a signal sensor or the like may be arranged at the door of the room where the wireless signal transponder 104 and the pattern recognizer 103 are located, for monitoring whether the user carrying the mobile terminal 101 enters the room. After the user enters the room, the pattern recognizer 103 connected with the signal sensor may assume that the mobile terminal 101 is located within the range of a wireless network of the wireless signal transponder 104, and then transmits the instruction to turn on the automatic call synchronization function to the mobile terminal 101 and the fixed terminal 102 respectively through the wireless signal transponder 104. For another example, the wireless signal transponder 104 connected with the pattern recognizer 103 may transmit a wireless signal outwardly every seconds as set. When entering the range of the wireless network of the wireless signal transponder 104, the mobile terminal 101 feeds a signal back after receiving the wireless signal. At this time, after receiving the feedback signal, the pattern recognizer 103 transmits the instruction to turn on the automatic call synchronization function to the mobile terminal 101 and the fixed terminal 102 respectively through the wireless signal transponder 104.

In the specific implementation, in the above automatic call synchronization system provided by the embodiment of the present disclosure, the mobile terminal 101 is further used for turning off the automatic call synchronization function when determining to leave the range of the wireless network of the wireless signal transponder 104. In this way, the mobile terminal 101 turn off the automatic call synchronization function when leaving the range of the wireless network of the wireless signal transponder 104, so that the mobile terminal 101 will not transmit the call synchronization request to the pattern recognizer 103 when receiving the incoming calling signal, which reduces tedious operations and provides convenience as compared with the case in which the user is required to cancel the setting initiatively, as known by the inventor.

In the specific implementation, in the above automatic call synchronization system provided by the embodiment of the present disclosure, the pattern recognizer 103 is further used for determining whether the mobile terminal 101 exists within the range of the wireless network of the wireless signal transponder 104, and if no, transmitting an instruction to turn off the automatic call synchronization function to the fixed terminal 102 through the wireless signal transponder 104.

In the specific implementation, the above automatic call synchronization system provided by the embodiment of the present disclosure may further realize a function of using the fixed terminal to call the number stored in the mobile terminal. Specifically, in order to facilitate the user to search the fixed terminal for the number stored in the mobile terminal so as to facilitate calling initiatively, the fixed terminal 102 generally has a display module. The user may transmit by the fixed terminal a request for addressing a particular mobile terminal to the pattern recognizer 103. For example, the user may trigger a button matched with a certain mobile terminal on the fixed terminal 102, the fixed terminal 102 then transmits an addressing request carrying the identification information of the mobile terminal to the wireless signal transponder 104. After receiving the addressing request carrying the identification information of the mobile terminal 101 transmitted by the fixed terminal 102, the wireless signal transponder 104 transmit the addressing request to the pattern recognizer 103 for authentication. Specifically, the pattern recognizer 103 is further used for receiving through the wireless signal transponder 104 the addressing request carrying the identification information of the mobile terminal 101 transmitted by the fixed terminal 102, authenticating the mobile terminal 101 according to the identification information of the mobile terminal 101, and transmitting an addressing information acquisition request to the corresponding mobile terminal through the wireless signal transponder 104 after the authentication is successful. Specifically, the procedure that the pattern recognizer 103 authenticates the mobile terminal 101 is as follows: the pattern recognizer 103 firstly performs computation and matching between the information of the addressing request and its own database information, and if the matching is successful, it means that the authentication on the mobile terminal 101 is successful. The mobile terminal 101 is further used for transmitting, after receiving the addressing information acquisition request forwarded by the wireless signal transponder 104, through the wireless signal transponder the stored corresponding information to the fixed terminal for displaying. In this way, the user may operate on the fixed terminal 102 to initiatively call the number stored in the mobile terminal 101. The corresponding information stored in the mobile terminal 101 may include the information such as address books, short messages, browsed web pages, etc, and is not limited here.

For example, Mr. Zhang needs to call Mr. Li's mobile terminal. Mr. Zhang uses the fixed terminal to transmit the addressing request carrying the ID information of Mr. Zhang's mobile terminal to the wireless signal transponder. The wireless signal transponder transmits the addressing request to the pattern recognizer. The pattern recognizer begins to perform the identity authentication on Mr. Zhang's mobile terminal according to the ID information of the mobile terminal. After the identity authentication is successful, the pattern recognizer notifies the wireless signal transponder to transmit the addressing information acquisition request to the recognized mobile terminal with the ID information. At this time, after receiving the addressing information acquisition request, Mr. Zhang's mobile terminal transmits through the wireless signal transponder the stored information including Mr. Li's mobile terminal number to the fixed terminal for displaying for Mr. Zhang. Then, Zhang San may use the fixed terminal to initiatively call Mr. Li's mobile terminal according to the number displayed by the display screen.

Figure 2:
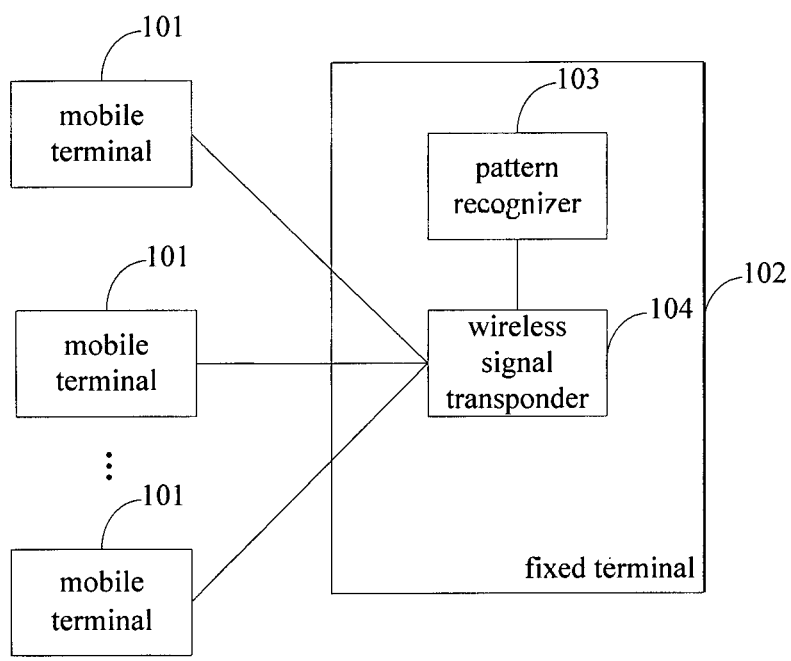
FIG. 2 is a second structural schematic diagram of an automatic call synchronization system provided by an embodiment of the present disclosure.
Figure 3:
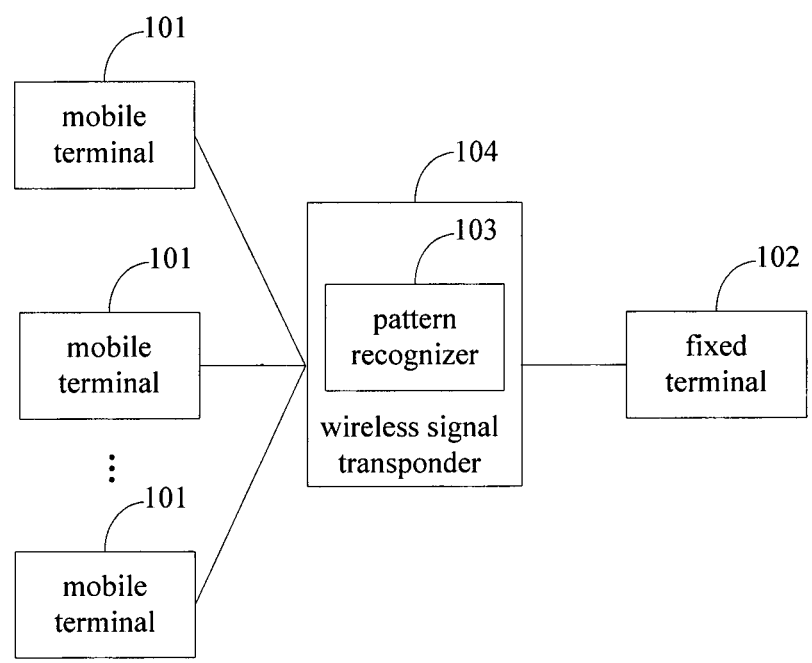
FIG. 3 is a third structural schematic diagram of an automatic call synchronization system provided by an embodiment of the present disclosure.

In the specific implementation, there may be many ways to integrate the pattern recognizer 103 and the wireless signal transponder 104 in the above automatic call synchronization system provided by the embodiment of the present disclosure. For example, as shown in FIG. 2, the pattern recognizer 103 and the wireless signal transponder 104 may be integrated into the fixed terminal 102, which can enhance the degree of the integration of devices while reducing the space occupied by devices. Also, as shown in FIG. 3, the pattern recognizer 103 may be integrated into the wireless signal transponder 104, and the wireless signal transponder 104 and the fixed terminal 102 may be designed separately.

In the following, the way to realize the automatic call synchronization by the automatic call synchronization system provided by the embodiment of the present disclosure is explained in detail with three specific embodiments.

Figure 4:
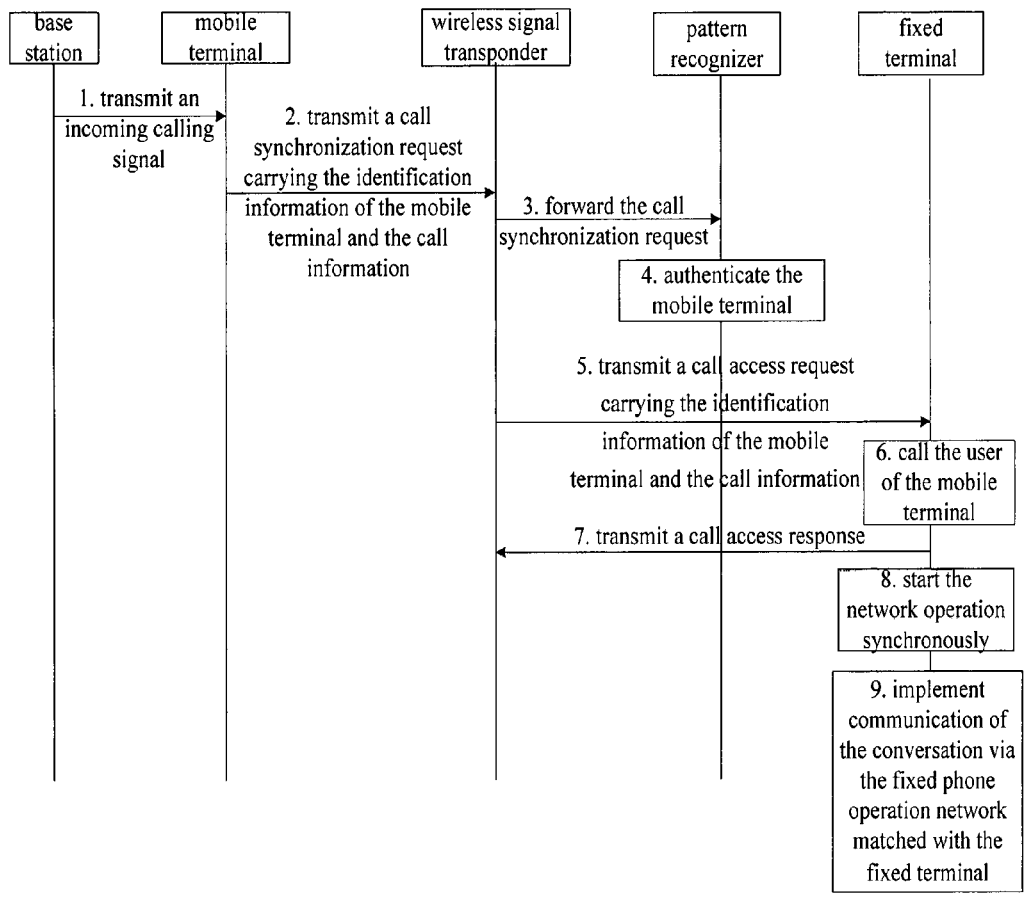
FIG. 4 is a first signaling interaction diagram of an automatic call synchronization system provided by an embodiment of the present disclosure.

The first embodiment: as shown in FIG. 4, specific steps for implementing the automatic call synchronization are as follows.

1. A base station transmits an incoming calling signal to a mobile terminal.
2. When receiving the incoming calling signal and determining that the automatic call synchronization function is turn on, the mobile terminal transmits to the wireless signal transponder a call synchronization request carrying the identification information of the mobile terminal and the call information.
3. The wireless signal transponder forwards the call synchronization request to the pattern recognizer.
4. The pattern recognizer authenticates the mobile terminal according to the identification information of the mobile terminal.

In the specific implementation, the way to authenticate the mobile terminal may be a conventional way of authentication, that is, the identification information of the mobile terminal may be compared directly with the identification information stored in the database of the pattern recognizer and then it is judged whether the identification information of the mobile terminal is correct. There may be many kinds of such way of authentication, and it is not limited here.

5. The pattern recognizer transmits through the wireless signal transponder to the fixed terminal a call access request carrying the identification information of the mobile terminal and the call information after the authentication is successful.
6. The fixed terminal calls the user of the mobile terminal according to the identification information of the mobile terminal and the call information.
7. When the call is answered by the user using the fixed terminal, the fixed terminal transmits a call access response to the wireless signal transponder.
8. The network operation of the fixed terminal is started synchronously.
9. The fixed terminal establishes the communication for the conversation via the fixed phone operation network matched with the fixed terminal.

To this point, the automatic call synchronization function is achieved by the above steps 1-9 provided by the embodiment, so that the call may be answered by using the fixed terminal, thus saving the call charge.

Figure 5:
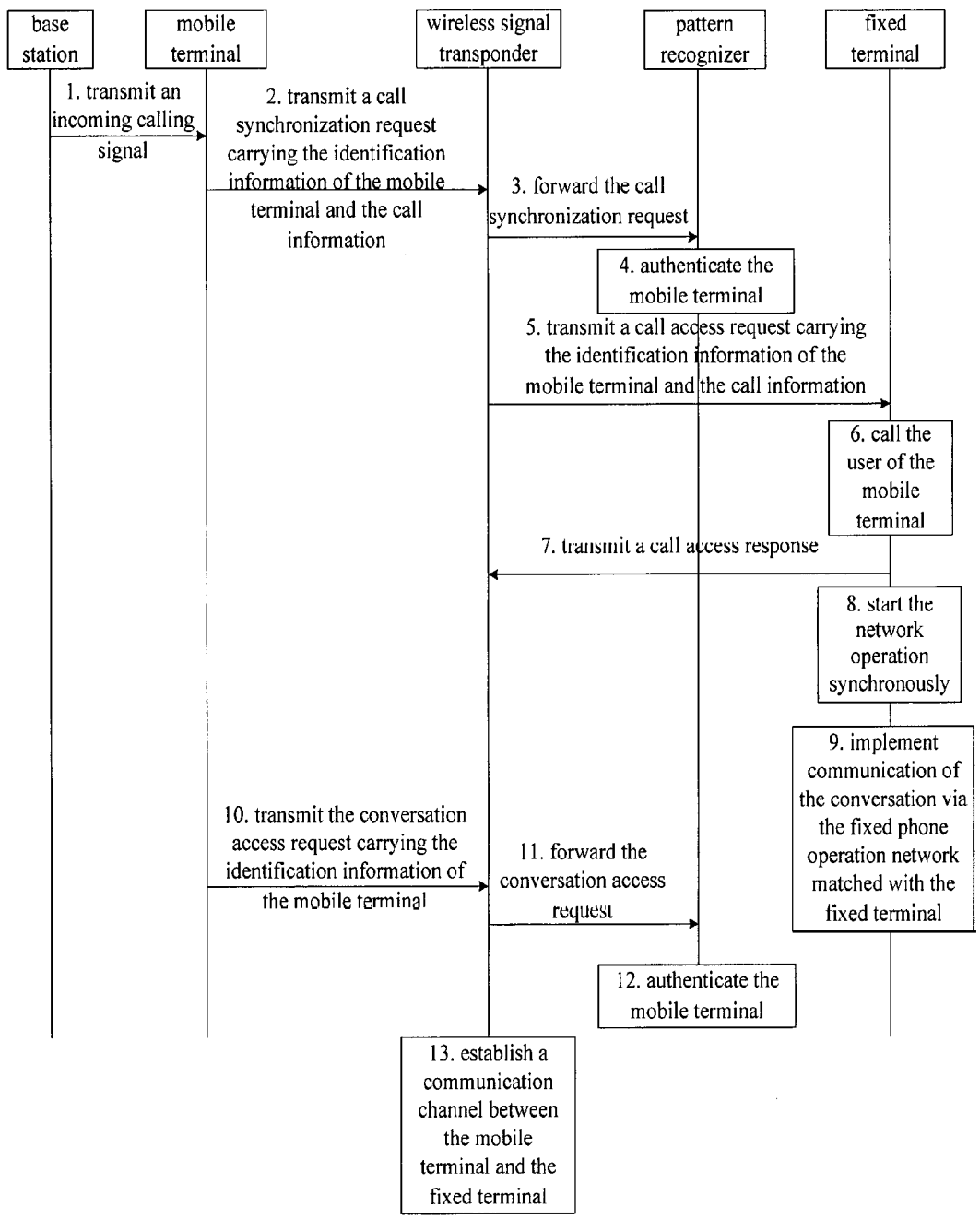
FIG. 5 is a second signaling interaction diagram of an automatic call synchronization system provided by an embodiment of the present disclosure.

The second embodiment: as shown in FIG. 5, specific steps for implementing the automatic call synchronization are as follows.

Steps 1-9 are totally same as steps 1-9 in the first embodiment and thus are no longer described here for avoiding redundancy.

After the fixed terminal establishes the communication for the conversation via the fixed phone operation network matched with the fixed terminal at step 9, the specific steps below may be performed.

10. When determining that the user uses the mobile terminal to answer the call, the mobile terminal transmits to the wireless signal transponder the conversation access request carrying the identification information of the mobile terminal.
11. The wireless signal transponder forwards the conversation access request to the pattern recognizer.
12. The pattern recognizer authenticates the mobile terminal according to the identification information of the mobile terminal.
13. The pattern recognizer establishes a communication channel between the mobile terminal and the fixed terminal through the wireless signal transponder after the authentication is successful.

To this point, the three-party simultaneous conversation function is achieved by the above steps 1-13 provided by the embodiment.

Figure 6:
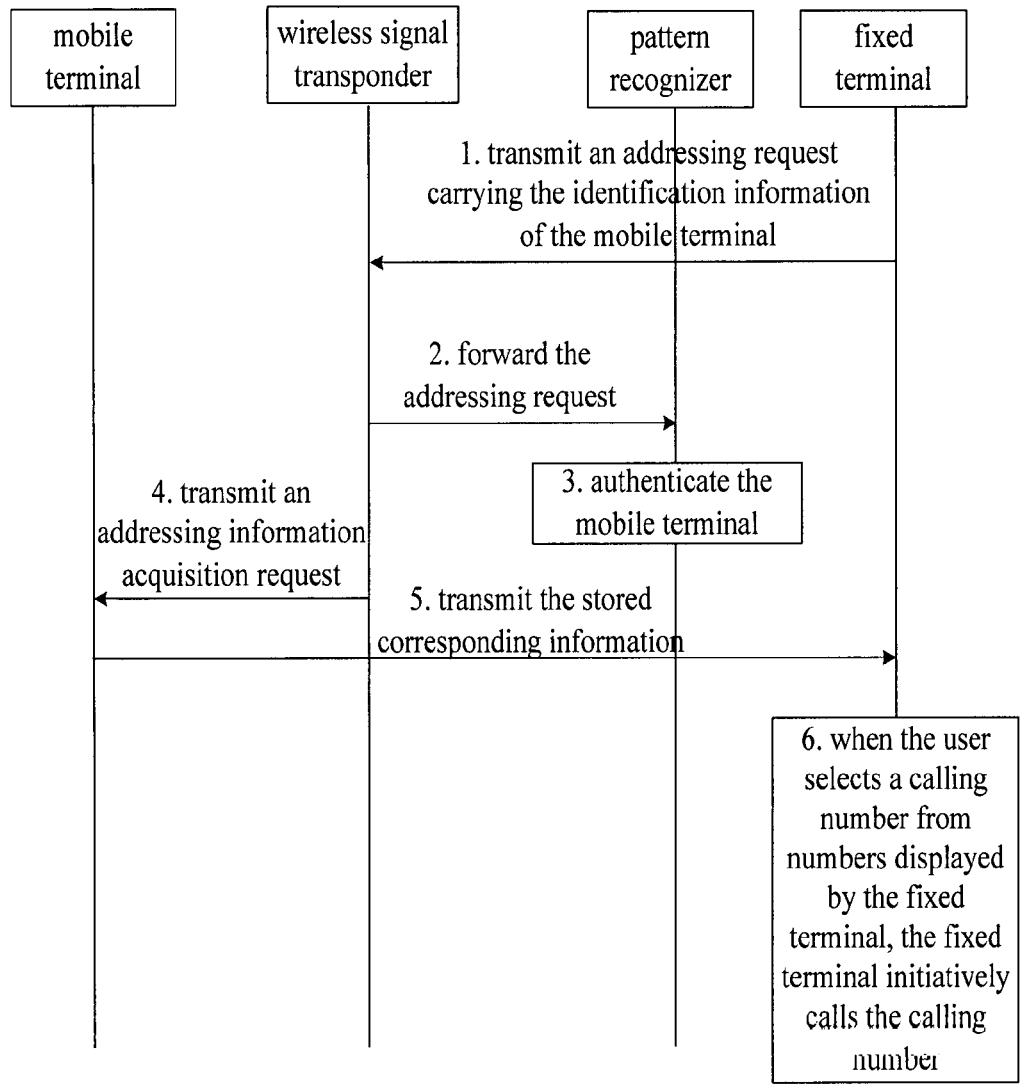
FIG. 6 is a third signaling interaction diagram of an automatic call synchronization system provided by an embodiment of the present disclosure.

The third embodiment: as shown in FIG. 6, specific steps for implementing the automatic call synchronization are as follows.

1. The fixed terminal transmits to the wireless signal transponder an addressing request carrying the identification information of the mobile terminal.
2. The wireless signal transponder towards the addressing request to the pattern recognizer.
3. The pattern recognizer authenticates the mobile terminal according to the identification information of the mobile terminal.
4. The pattern recognizer transmits through the wireless signal transponder to the corresponding mobile terminal an addressing information acquisition request after the authentication is successful.
5. The mobile terminal transmits through the wireless signal transponder the stored corresponding information to the fixed terminal for displaying.
6. When the user selects a calling number from numbers displayed by the fixed terminal, the fixed terminal initiatively calls the calling number.

To this point, the function of initiatively calling the number stored in the mobile terminal using the fixed terminal is achieved by the above steps 1-6 provided by the embodiment. Initiating a call using the fixed terminal can save the call charge and/or provide convenient operation. Note that, sometimes, to be more convenient, if the user is in the vicinity of the fixed terminal and the mobile phone is not carried at this time, making a call by using the fixed terminal directly avoids looking for the mobile terminal.

Based on the same inventive concept, an embodiment of the present disclosure further provides an automatic call synchronization method. Since the principle of solving the problem by the method is similar to that by the above automatic call synchronization system, the implementation of the method may refer to the implementation of the system, and repetition will no longer be described for avoiding redundancy.

Figure 7:
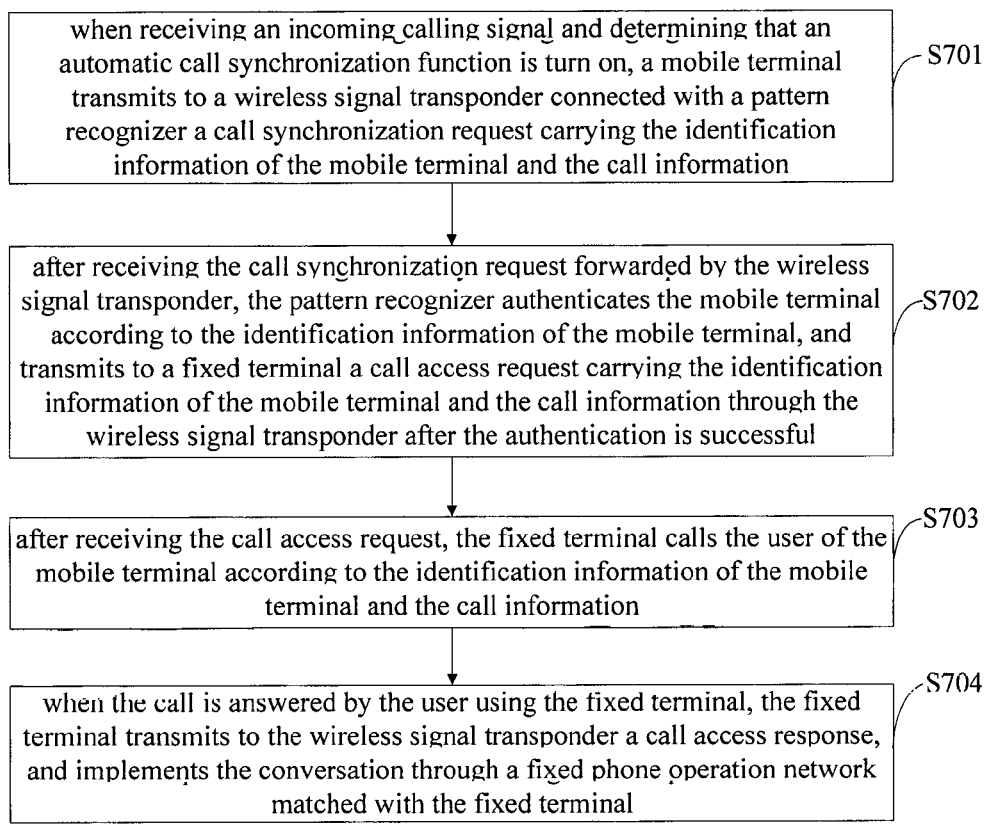
FIG. 7 is a schematic flow diagram of an automatic call synchronization method provided by an embodiment of the present disclosure.

Specifically, an automatic call synchronization method provided by the embodiment of the present disclosure, as shown in FIG. 7, includes the following steps.

At S701, when receiving an incoming call signal and determining that an automatic call synchronization function is turn on, a mobile terminal transmits to a wireless signal transponder connected with a pattern recognizer a call synchronization request carrying the identification information of the mobile terminal and the call information.

At S702, after receiving the call synchronization request forwarded by the wireless signal transponder, the pattern recognizer authenticates the mobile terminal according to the identification information of the mobile terminal, and transmits to a fixed terminal a call access request carrying the identification information of the mobile terminal and the call information through the wireless signal transponder after the authentication is successful.

At S703, after receiving the call access request, the fixed terminal calls the user of the mobile terminal according to the identification information of the mobile terminal and the call information.

At S704, when the call is answered by the user using the fixed terminal, the fixed terminal transmits to the wireless signal transponder a call access response, and implements the conversation through a fixed phone operation network matched with the fixed terminal.

In one possible implementation, in the above automatic call synchronization method provided by the embodiment of the present disclosure, the following steps are also included:

when determining that the user answers the call using the mobile terminal, the mobile terminal transmits to the pattern recognizer a conversation access request carrying the identification information of the mobile terminal through the wireless signal transponder.

After receiving the call access response and the conversation access request forwarded by the wireless signal transponder, the pattern recognizer authenticates the mobile terminal according to the identification information of the mobile terminal, and establishes a communication channel between the mobile terminal and the fixed terminal through the wireless signal transponder after the authentication is successful.

In one possible implementation, in the above automatic call synchronization method provided by the embodiment of the present disclosure, the following step is also included:

the pattern recognizer determines whether the mobile terminal is located within the range of a wireless network of the wireless signal transponder, and if yes, transmits an instruction to turn on the automatic call synchronization function to the mobile terminal and the fixed terminal respectively through the wireless signal transponder.

In one possible implementation, in the above automatic call synchronization method provided by the embodiment of the present disclosure, the following step is also included:

when determining that the mobile terminal is located within the range of the wireless network of the wireless signal transponder, the pattern recognizer acquires the identification information of the mobile terminal through the wireless signal transponder, and transmits the instruction to turn on the automatic call synchronization function to the mobile terminal and the fixed terminal respectively through the wireless signal transponder after the authentication on the mobile terminal is successful.

In one possible implementation, in the above automatic call synchronization method provided by the embodiment of the present disclosure, the following step is also included:

when determining leaving the range of the wireless network of the wireless signal transponder, the mobile terminal turn offs the automatic call synchronization function.

In one possible implementation, in the above automatic call synchronization method provided by the embodiment of the present disclosure, the following step is also included:

the pattern recognizer determines whether the mobile terminal exists within the range of the wireless network of the wireless signal transponder, and if no, transmits an instruction to turn off the automatic call synchronization function to the fixed terminal through the wireless signal transponder.

In one possible implementation, in the above automatic call synchronization method provided by the embodiment of the present disclosure, the following steps are also included:

the pattern recognizer receives through the wireless signal transponder an addressing request carrying the identification information of the mobile terminal transmitted by the fixed terminal, authenticates the mobile terminal according to the identification information of the mobile terminal, and transmits an addressing information acquisition request to the corresponding mobile terminal through the wireless signal transponder after the authentication is successful;

After receiving the addressing information acquisition request forwarded by the wireless signal transponder, the mobile terminal transmits through the wireless signal transponder the stored corresponding information to the fixed terminal for displaying.

With the above description of implementations, those skilled in the art may clearly understand that embodiments of the present disclosure may be implemented by hardware or by way of software plus a necessary general hardware platform. Based on such understanding, technical solutions of the present disclosure may embodied in the form of software product which may be stored in one non-volatile storage medium (which may be a CD-ROM, a flash disk, a removable hard disk, etc) and contain several instructions for causing one computer device (which may be a personal computer, a server, a network device, etc) to execute the method as described in respective embodiments of the present disclosure.

It can be understood by those skilled in the art that attached drawings are only schematic diagrams of embodiments and modules or flows in the drawings are not necessary for implementing the present disclosure.

It can be understood by those skilled in the art that modules in one apparatus in the embodiment may distributed in the apparatus of the embodiments as described, or may be changed to be located in one or more apparatus different from the embodiment. The modules of the above embodiments may be combined into one module, or may be further divided into multiple sub-modules.

The sequence numbers of the above embodiments of the present disclosure are only for the purpose of description and do not represent embodiments being superior or inferior.

Embodiments of the present disclosure provide an automatic call synchronization system and method. The system includes a wireless signal transponder, at least one mobile terminal having a wireless communication module, a fixed terminal having a wireless communication module and a pattern recognizer connected with the wireless signal transponder. The mobile terminal is used for transmitting, when receiving an incoming calling signal and determining that an automatic call synchronization function is turn on, to the wireless signal transponder a call synchronization request carrying the identification information of the mobile terminal and the call information. The pattern recognizer is used for authenticating, after receiving the call synchronization request forwarded by the wireless signal transponder, the mobile terminal according to the identification information of the mobile terminal, and transmitting to the fixed terminal a call access request carrying the identification information of the mobile terminal and the call information through the wireless signal transponder after the authentication is successful. The fixed terminal is used for calling the user of the mobile terminal according to the identification information of the mobile terminal and the call information after receiving the call access request, and transmitting, when the call is answered by the user using the fixed terminal, to the wireless signal transponder a call access response and implementing the conversation through a fixed phone operation network matched with the fixed terminal. The above automatic call synchronization system provided by the embodiment of the present disclosure may synchronize a call signal to the fixed terminal automatically when the call signal is received by the mobile terminal, so as to realize that the user may selectively use the mobile terminal and/or the fixed terminal to answer the call, which brings convenience to the user for answering the call and improves the degree of the automation of the call synchronization function. Furthermore, the conversation is implemented via the fixed phone operation network matched with the fixed terminal when the call is answered, thus further saving the call charge.

Obviously, those skilled in the art may make a variety of changes and variations to the present disclosure without departing from the spirit and scope of the present disclosure. In this way, if such changes and variations to the present disclosure belong to the scope of claims of the present disclosure and the equivalent techniques thereof, the present disclosure is intended to cover such changes and variations too.

The present application claims the priority of a Chinese patent application No. 201410798416.2 submitted on Dec. 19, 2014, the full content disclosed by which is referenced hereby as a part of the present application.

What is claimed is:

1. An automatic call synchronization system, comprising a wireless signal transponder, at least one mobile terminal having a wireless communication module, a fixed terminal having a wireless communication module and a pattern recognizer connected with the wireless signal transponder, wherein the mobile terminal is configured to transmit, when receiving an incoming calling signal and determining that an automatic call synchronization function is turn on, to the wireless signal transponder a call synchronization request carrying identification information of the mobile terminal and call information;

the pattern recognizer is configured to authenticate, after receiving the call synchronization request forwarded by the wireless signal transponder, the mobile terminal according to the identification information of the mobile terminal, and transmitting to the fixed terminal a call access request carrying the identification information of the mobile terminal and the call information through the wireless signal transponder after the authentication is successful;

the fixed terminal is configured to call a user of the mobile terminal according to the identification information of the mobile terminal and the call information after receiving the call access request, and transmitting, when the call is answered by the user using the fixed terminal, to the wireless signal transponder a call access response and implementing a conversation through a fixed phone operation network matched with the fixed terminal.

2. The automatic call synchronization system according to claim 1, wherein the mobile terminal is further configured to transmit to the pattern recognizer a conversation access request carrying the identification information of the mobile terminal through the wireless signal transponder when determining that the user answers the call using the mobile terminal;

the pattern recognizer is further configured to authenticate the mobile terminal according to the identification information of the mobile terminal after receiving the call access response and the conversation access request forwarded by the wireless signal transponder, and establishing a communication channel between the mobile terminal and the fixed terminal through the wireless signal transponder after the authentication is successful.

3. The automatic call synchronization system according to claim 1, wherein the pattern recognizer is further configured to determine whether the mobile terminal is located within a range of a wireless network of the wireless signal transponder, and if yes, transmitting an instruction to turn on the automatic call synchronization function to the mobile terminal and the fixed terminal respectively through the wireless signal transponder.

4. The automatic call synchronization system according to claim 3, wherein the pattern recognizer is further configured to acquire, when determining that the mobile terminal is located within the range of the wireless network of the wireless signal transponder, the identification information of the mobile terminal through the wireless signal transponder, and transmitting the instruction to turn on the automatic call synchronization function to the mobile terminal and the fixed terminal respectively through the wireless signal transponder after the authentication on the mobile terminal is successful.

5. The automatic call synchronization system according to claim 3, wherein the mobile terminal is further configured to turn off the automatic call synchronization function when determining leaving the range of the wireless network of the wireless signal transponder.

6. The automatic call synchronization system according to claim 3, wherein the pattern recognizer is further configured to determine whether the mobile terminal exists within the range of the wireless network of the wireless signal transponder, and if no, transmitting an instruction to turn off the automatic call synchronization function to the fixed terminal through the wireless signal transponder.

7. The automatic call synchronization system according to claim 1, wherein the fixed terminal has a voice playing module and/or a display module;

the fixed terminal is configured to call the user of the mobile terminal through the voice playing module and/or the display module after receiving the call access request.

8. The automatic call synchronization system according to claim 1, wherein the fixed terminal has a display module;

the pattern recognizer is further configured to receive through the wireless signal transponder an addressing request carrying the identification information of the mobile terminal transmitted by the fixed terminal, authenticate the mobile terminal according to the identification information of the mobile terminal, and transmit an addressing information acquisition request to a corresponding mobile terminal through the wireless signal transponder after the authentication is successful;

the mobile terminal is further configured to transmit through the wireless signal transponder corresponding stored information to the fixed terminal for displaying after receiving the addressing information acquisition request forwarded by the wireless signal transponder.

9. The automatic call synchronization system according to claim 1, wherein the pattern recognizer and the wireless signal transponder are integrated into the fixed terminal.

10. The automatic call synchronization system according to claim 1, wherein the pattern recognizer is integrated into the wireless signal transponder.

11. An automatic call synchronization method, comprising:

transmitting, by a mobile terminal, to a wireless signal transponder connected with a pattern recognizer a call synchronization request carrying identification information of the mobile terminal and call information when receiving an incoming calling signal and determining that an automatic call synchronization function is turn on;

after receiving the call synchronization request forwarded by the wireless signal transponder, authenticating, by the pattern recognizer, the mobile terminal according to the identification information of the mobile terminal, and transmitting to a fixed terminal a call access request carrying the identification information of the mobile terminal and the call information through the wireless signal transponder after the authentication is successful;

after receiving the call access request, calling, by the fixed terminal, a user of the mobile terminal according to the identification information of the mobile terminal and the call information; and when the call is answered by the user using the fixed terminal, transmitting, by the fixed terminal, to the wireless signal transponder a call access response and implementing a conversation through a fixed phone operation network matched with the fixed terminal.

12. The method according to claim 11, further comprising:
when determining that the user answers the call using the mobile terminal, transmitting, by the mobile terminal, to the pattern recognizer a conversation access request carrying the identification information of the mobile terminal through the wireless signal transponder;
after receiving the call access response and the conversation access request forwarded by the wireless signal transponder, authenticating, by the pattern recognizer, the mobile terminal according to the identification information of the mobile terminal and establishing a communication channel between the mobile terminal and the fixed terminal through the wireless signal transponder after the authentication is successful.

13. The method according to claim 12, further comprising:
receiving, by the pattern recognizer, through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;
after receiving the addressing information acquisition request forwarded by the wireless signal transponder, transmitting, by the mobile terminal, through the wireless signal transponder stored corresponding information to the fixed terminal for displaying.

14. The method according to claim 11, further comprising:
determining, by the pattern recognizer, whether the mobile terminal is located within a range of a wireless network of the wireless signal transponder, and if yes, transmitting an instruction to turn on the automatic call synchronization function to the mobile terminal and the fixed terminal respectively through the wireless signal transponder.

15. The method according to claim 14, comprising:
when determining that the mobile terminal is located within the range of the wireless network of the wireless signal transponder, acquiring, by the pattern recognizer, the identification information of the mobile terminal through the wireless signal transponder, and transmitting the instruction to turn on the automatic call synchronization function to the mobile terminal and the fixed terminal respectively through the wireless signal transponder after the authentication on the mobile terminal is successful.

16. The method according to claim 15, further comprising:
receiving, by the pattern recognizer, through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;
after receiving the addressing information acquisition request forwarded by the wireless signal transponder, transmitting, by the mobile terminal, through the wireless signal transponder stored corresponding information to the fixed terminal for displaying.

17. The method according to claim 14, further comprising:
when determining leaving the range of the wireless network of the wireless signal transponder, turning off, by the mobile terminal, the automatic call synchronization function.

18. The method according to claim 14, further comprising:
determining, by the pattern recognizer, whether the mobile terminal exists within the range of the wireless network of the wireless signal transponder, and if no, transmitting an instruction to turn off the automatic call synchronization function to the fixed terminal through the wireless signal transponder.

19. The method according to claim 14, further comprising:
receiving, by the pattern recognizer, through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;
after receiving the addressing information acquisition request forwarded by the wireless signal transponder, transmitting, by the mobile terminal, through the wireless signal transponder stored corresponding information to the fixed terminal for displaying.

20. The method according to claim 11, further comprising:
receiving, by the pattern recognizer, through the wireless signal transponder an addressing request carrying the identification information of the mobile terminal transmitted by the fixed terminal, authenticating the mobile terminal according to the identification information of the mobile terminal, and transmitting an addressing information acquisition request to the corresponding mobile terminal through the wireless signal transponder after the authentication is successful;
after receiving the addressing information acquisition request forwarded by the wireless signal transponder, transmitting, by the mobile terminal, through the wireless signal transponder stored corresponding information to the fixed terminal for displaying.

* * * * *